United States Patent
Soetbeer et al.

(10) Patent No.: US 12,391,821 B2
(45) Date of Patent: Aug. 19, 2025

(54) METHOD FOR THE DEVULCANIZATION OF A VULCANIZED RUBBER MIXTURE, DEVICE FOR CARRYING OUT THE METHOD AND USE OF THE DEVICE FOR THE DEVULCANIZATION OF A VULCANIZED RUBBER MIXTURE

(71) Applicant: Continental Reifen Deutschland GmbH, Hannover (DE)

(72) Inventors: Inga Soetbeer, Celle (DE); Konstantin Efimov, Hannover (DE); Nils Krüger, Garbsen (DE); Shreyas Naik, Hannover (DE); Thomas Völker, Seelze (DE); Hilke Wolf, Isernhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 652 days.

(21) Appl. No.: 17/756,962

(22) PCT Filed: Oct. 27, 2020

(86) PCT No.: PCT/EP2020/080143
§ 371 (c)(1),
(2) Date: Jun. 6, 2022

(87) PCT Pub. No.: WO2021/115678
PCT Pub. Date: Jun. 17, 2021

(65) Prior Publication Data
US 2023/0028139 A1    Jan. 26, 2023

(30) Foreign Application Priority Data
Dec. 11, 2019   (DE) .................... 10 2019 219 372.2

(51) Int. Cl.
*C08L 7/00*    (2006.01)
*C08J 11/12*   (2006.01)

(52) U.S. Cl.
CPC ............... *C08L 7/00* (2013.01); *C08J 11/12* (2013.01); *C08J 2307/00* (2013.01); *C08J 2409/00* (2013.01); *C08J 2409/06* (2013.01)

(58) Field of Classification Search
CPC ........ C08J 11/10; C08J 11/12; C08J 2407/00; C08J 2409/00; C08J 2417/00; C08J 2419/00; C08J 2421/00
See application file for complete search history.

(56) References Cited

U.S. PATENT DOCUMENTS

| | | |
|---|---|---|
| 6,632,918 B1 | 10/2003 | Matsushita et al. |
| 7,189,762 B2 | 3/2007 | Tzoganakis |

(Continued)

FOREIGN PATENT DOCUMENTS

| | | | | |
|---|---|---|---|---|
| CN | 102250381 A | | 11/2011 | |
| CN | 102344592 A | * | 2/2012 | ........... B29B 7/7461 |

(Continued)

OTHER PUBLICATIONS

Machine Translation of CN102344592A. Feb. 8, 2012. (Year: 2012).*

(Continued)

*Primary Examiner* — Stephen E Rieth
(74) *Attorney, Agent, or Firm* — Richard A. Wolf; Gregory Adams

(57) ABSTRACT

The invention relates to a process for devulcanizing a vulcanized rubber mixture, comprising the following steps: A) providing or producing a vulcanized rubber mixture, B) comminuting the vulcanized rubber mixture to a granular material composed of vulcanized rubber particles, where the vulcanized rubber particles have a maximum particle diameter of 100 mm, C) extruding the vulcanized rubber particles produced in step B) in a twin-screw extruder at a shear rate of less than 100 s$^{-1}$, where the temperature of the vulcanized (Continued)

rubber particles during extrusion is less than 200° C., to give a devulcanized rubber mixture having a temperature above 100° C., D) cooling the devulcanized rubber mixture in a further kneading unit, so as to give a devulcanized rubber mixture having a temperature in the range from 50° C. to 100° C. The invention further relates to an apparatus for performing the process and to the use of the apparatus for devulcanization of a vulcanized rubber mixture.

19 Claims, 2 Drawing Sheets

(56) References Cited

U.S. PATENT DOCUMENTS

| | | | |
|---|---|---|---|
| 2013/0137786 A1 | 5/2013 | Maris | |
| 2015/0148435 A1 | 5/2015 | Arnaud | |
| 2018/0251624 A1 | 9/2018 | Rust | |
| 2022/0258401 A1* | 8/2022 | Martena | B29B 7/7495 |

FOREIGN PATENT DOCUMENTS

| | | |
|---|---|---|
| CN | 103052675 A | 4/2013 |
| CN | 105729755 A | 7/2016 |
| CN | 108822337 A | 11/2018 |
| DE | 102015224957 A1 | 6/2017 |
| DE | 102017216544 A1 | 3/2019 |
| EP | 1201390 A1 | 5/2002 |
| EP | 2601249 A1 | 6/2013 |
| KR | 901561 B1 * | 6/2009 |

OTHER PUBLICATIONS

Machine Translation of KR10-0901561B1. Jun. 8, 2009. (Year: 2009).*

European Examination Report dated May 14, 2024 for the counterpart European Patent Application No. 20 800 587.6 and machine translation of same.

International Search Report dated Jan. 27, 2021 of International Application PCT/EP2020/080143 on which this application is based.

2021Q01036 E. Grunschloss / Apr. 1, 2021 Screw channel an overview—Cited in NPL No. 1 https://www.sciencedirect.com/topics/engineering/screw-channel#:-:text=To%20calculate%20the%20shear%20rates,flight%20and%Z0the%20barrel%20wall.&text=(8.4)-,where%2O%CF%84%20%3D%20Shear%20stress%?0%3D%20F%2FA%20%30%20Force%20appfied,is%20shown%ZOin%20Figure%208.1.

Chinese Office Action date Jul. 21, 2023 corresponding to Chinese Application No. 202080084925.2.

* cited by examiner

METHOD FOR THE DEVULCANIZATION OF A VULCANIZED RUBBER MIXTURE, DEVICE FOR CARRYING OUT THE METHOD AND USE OF THE DEVICE FOR THE DEVULCANIZATION OF A VULCANIZED RUBBER MIXTURE

The invention relates to a process for devulcanization of a vulcanized rubber mixture.

The invention further relates to an apparatus for performing the process and to the use of the apparatus for devulcanization of a vulcanized rubber mixture.

As in most industries, the rubber industry too is obliged to use a minimum amount of material made from new raw materials, especially fossil raw materials, in the production of industrial rubber articles, and in particular to reuse materials.

One of the existing approaches for reuse of old rubber or used rubber is the devulcanizing of already vulcanized rubber. In such a devulcanization, the crosslinking between the rubber polymers in the rubber, which usually consists of sulfur-sulfur bonds, is split in order subsequently to recrosslink the "decrosslinked" rubber polymers and hence to obtain, with addition of further mixture constituents, a rubber mixture having the same properties as a freshly produced rubber mixture made from novel fossil or renewable raw materials.

The prior art discloses various processes for devulcanizing:

CN 105729755 discloses a multistage process for producing injection moulds from screw rubber, comprising the following steps: adding rubber powder to a feeding machine and controlling the feed volume of the feed to the twin screw in the first stage, heating the screw and the extruder barrel, and extruding the rubber powder with a hot barrel and a hot screw (cf. claim 1).

CN 102250381 B discloses a twin-screw desulfurization system for rubber, consisting of: a cylinder body, a twin screw and a heating apparatus in the cylinder body, the cylinder body having a feed port, the twin screw having a conveying section and having two or more mutually separated shear regions, and a transition section and a mixing section between two adjacent shear regions (cf. claim 1).

US 2015148435 discloses a process for devulcanizing a vulcanized rubber, comprising the following steps:
 a) providing at least one vulcanized rubber;
 b) comminuting the vulcanized rubber into aggregates;
 c) kneading the ground rubber obtained from step b) at a low shear rate between 100 1/s and 500 1/s, such that it is homogenized in terms of the size of the aggregates and of temperature;
 d) achieving non-degrading mechanical treatment on the kneaded rubber obtained from step c), employing a high shear rate between 1000 1/s and 1 000 000 1/s (cf. claim 1).

EP 1201390 discloses a process for devulcanizing crosslinked rubber, consisting of a reclaiming stage from crosslinked rubber, by applying shear stress to the crosslinked rubber, where the maximum pressure in the reclaiming stage is 1.5 MPa or more (cf. claim 1).

In the prior art, including the documents described above, the problem occurs that not only the sulfur-sulfur bonds between the rubber polymers are split, but also the polymer chains, which leads to shortening of the average chain length of the rubber polymers. This led to a poorer quality of the tires formed from these rubber mixtures, and should accordingly be prevented.

It is an object of the invention to provide a process for devulcanization of a vulcanized rubber mixture which gives rise to a devulcanized rubber mixture having improved properties and/or less shortened rubber polymer chains.

This object is achieved in accordance with the invention by a process for devulcanizing a vulcanized rubber mixture, comprising the steps of
 A) providing or producing a vulcanized rubber mixture,
 B) comminuting the vulcanized rubber mixture to a granular material composed of vulcanized rubber particles, where the vulcanized rubber particles have a maximum particle diameter of 100 mm,
 C) extruding the vulcanized rubber particles produced in step B) in a twin-screw extruder at a shear rate of less than 100 $s^{-1}$, where the temperature of the vulcanized rubber particles during extrusion is less than 200° C., to give a devulcanized rubber mixture having a temperature above 100° C.,
 D) cooling the devulcanized rubber mixture in a further kneading unit, so as to give a devulcanized rubber mixture having a temperature in the range from 50° C. to 100° C.

It is a major achievement of the present invention to have found that it is possible by virtue of the combination of a twin-screw extruder with a single-screw extruder and/or a gear pump to devulcanize vulcanized rubber particles, without observation of shortening of the polymer chains of the rubber molecules as reported from the prior art. Without wishing to be tied to any scientific theory, the lower degree of shortening of the polymer chains seems to result from compliance with the above temperature program in step C) and step D) of the process of the invention, and compliance with the low shear rate in the twin-screw extruder.

Devulcanized rubber mixtures obtained by means of the above process of the invention have better properties and, in particular, longer polymer chains, which are indicated especially by an improvement in the measurements of Mooney viscosity, Shore hardness, resilience and the 300 modulus.

It is preferable in the context of the invention that the twin screw extruder is a corotating twin screw extruder, and the shear forces attained in the further kneading unit are equal to or less than the maximum shear forces attained in step C) in the twin-screw extruder.

In the context of the present invention, the expression "in an extruder with a shear rate in the range from X to Y" means that the shear rate is in the range from X to Y over all screw segments of the extruder. In the context of the present invention, the shear rate of a screw segment of an extruder is calculated by means of the following formula:

$$\text{shear rate} = v/h \qquad \text{(Formula 1),}$$

where:
 $v = 2\pi \times$(speed of rotation of the screw [1/s])×(distance between the axis of rotation of the screw and the radially outermost point of the screw element in question [mm]);
 h=distance in a cross section at right angles to the axis of rotation of the screw between the inner face of the extrusion barrel and the outer surface of the screw core [mm].

In the context of the present invention, the expression "devulcanized" means that the processed, i.e. devulcanized, rubber mixture has fewer sulfur-sulfur bonds than the unprocessed, i.e. non-devulcanized, rubber mixture.

Preference is given to a process as described above or as described above as preferred, wherein the further kneading unit in step d) comprises a single-screw extruder and/or a gear pump.

One advantage of the above-described aspect of the present invention is that a single-screw extruder and/or a gear pump enables excellent temperature control of the extruded rubber mixture and hence even better compliance of the temperatures in step C) and step D) of a process of the invention can be ensured.

More preferably, the further kneading unit is disposed between the twin-screw extruder and a filter unit described hereinafter, since it can be ensured in this way that sufficient feeding for the rubber mixture can be achieved in order to push the devulcanized rubber mixture through the filter unit.

However, it is also possible, rather than a single-screw extruder in the further kneading unit, to use what is called a material loop, in which case the rubber mixture devulcanized in the twin-screw extruder, at the end of the twin-screw extruder, is pushed through a nozzle to give a rubber strand and this rubber strand is cooled down to a target temperature by means of the ambient temperature for a predefined period of time, before the rubber strand thus extruded is then guided into the gear pump. This enables better temperature control and especially faster adjustment of the cooling time in the changeover to a new rubber mixture with a different composition.

Such loop units for forming a material loop and for adjusting the length of the material loop, also called intermediate storage means for a rubber mixture belt, are disclosed, for example, in publication DE 102017216544 A1 (see paragraph [0013] therein).

Preference is given to a process as described above or as described above as preferred, wherein, during the extruding in step C), a specific energy input of 0.01 to 5 kWh/kg per screw is introduced into the vulcanized rubber particles, based on the total mass of the vulcanized rubber particles extruded in step C), preferably 0.1 to 2.5 kWh/kg per screw.

One advantage of the above-described aspect of the present invention is that the above-described energy inputs can achieve particularly free-flowing mixtures because a maximum number of sulfur-sulfur bonds and a maximum number of polymer chains are destroyed.

Preference is given to a process as described above or as described above as preferred, wherein, after the cooling in step D) that takes place in the further kneading unit, the devulcanized rubber mixture, in a step E),
is heated to a temperature of 50° C. to 150° C., preferably of 100° C. to 150° C.,
and/or
is pushed through a filter unit comprising a sieve and/or a perforated plate, wherein the devulcanized rubber mixture, on account of the pushing through the filter unit, is preferably heated to a temperature of 50° C. to 150° C., preferably of 100° C. to 150° C.

One advantage of the above-described aspect of the present invention is that rubber mixtures that have been devulcanized according to the above-described aspect can be mixed particularly rapidly with other rubber mixtures and hence facilitate the subsequent production process.

Preference is given to a process as described above or as described above as preferred, wherein the twin-screw extruder in step C) has a length of less than 60 D.

One advantage of the above-described aspect of the present invention is that the polymer chains of the rubber molecules do not become shorter than in the case of other twin-screw extruders. This can be measured by the above-described properties of the resultant rubber mixture or of the vulcanizate which is then obtained from this rubber mixture.

Preference is given to a process as described above or as described above as preferred, wherein, during the extruding in step C), a means of controlling the temperature of the extruded rubber particles is added to the twin-screw extruder.

One advantage of the above-described aspect of the present invention is that the polymer chains of the rubber molecules do not become shorter on account of the lower temperature as a result of the supplying of the means of temperature control. This can be measured by the above-described properties of the resultant rubber mixture or of the vulcanizate which is then obtained from this rubber mixture.

One example of such a means of temperature control is any known process oil that can be mixed with rubber mixtures. The means of temperature control is preferably sunflower oil.

Preference is given to a process as described above or as described above as preferred, wherein, during the extruding in step C), the means of controlling the temperature of the extruded rubber particles has a specific heat transfer coefficient to EN ISO 6946 in the range from 100 to 5000 $W/(m^2 \cdot K)$ and/or a specific heat capacity in the range from 3 to 5 kJ/(kg·K).

One advantage of the above-described aspect of the present invention is that such means of temperature control are of particularly good suitability for a process of the invention.

Preference is given to a process as described above or as described above as preferred, wherein, during the extruding in step C), the screw speed of the screws of the twin-screw extruder is mainly within the range from 10 to 500 revolutions per minute, preferably in the range from 100 to 300 revolutions per minute.

One advantage of the above-described aspect of the present invention is that the polymer chains of the rubber molecules do not become shorter than in the case of other speed settings on account of the lower rate of rotation per minute. This can be measured by the above-described properties of the resultant rubber mixture or of the vulcanizate which is then obtained from this rubber mixture.

Preference is given to a process as described above or as described above as preferred, wherein, during the extruding in step C), the means of controlling the temperature of the extruded rubber particles does not react chemically with the rubber particles within the temperature range between 10° C. and 200° C. and/or is selected from the group consisting of mineral oils and water-based processing auxiliaries.

Particularly preferred water-based processing auxiliaries are the processing auxiliaries that are customary in the rubber industry in aqueous solution or in emulsion with water.

One advantage of the above-described aspect of the present invention is that such means of temperature control are of particularly good suitability for a process of the invention.

Preference is given to a process as described above or as described above as preferred, wherein step D) is performed within a period from 0.001 to 3 h, preferably within a period from 0.01 to 1 h, more preferably within a period from 0.02 to 0.5 h.

In the context of the present invention, step D) begins when the devulcanized rubber mixture leaves the twin-screw extruder, and ends when the devulcanized rubber mixture leaves the kneading unit, especially the gear pump.

Preference is given to a process as described above or as described above as preferred, wherein the vulcanized rubber particles produced in step B) are extruded in step C) in the twin-screw extruder at a shear rate in the range from 10 to 80 s$^{-1}$.

One advantage of the above-described aspect of the present invention is that the polymer chains of the rubber molecules do not become shorter than in the case of other twin-screw extruders on account of the lower shear rate. This can be measured by the above-described properties of the resultant rubber mixture or of the vulcanizate which is then obtained from this rubber mixture.

Preference is given to a process as described above or as described above as preferred, wherein the temperature of the vulcanized rubber particles during the extruding in step C) is in the range from 105 to 180° C., preferably in the range from 110 to 150° C.

One advantage of the above-described aspect of the present invention is that the polymer chains of the rubber molecules do not become shorter on account of the lower temperature. This can be measured by the above-described properties of the resultant rubber mixture or of the vulcanizate which is then obtained from this rubber mixture.

Preference is given to a process as described above or as described above as preferred, wherein the resulting devulcanized rubber mixture in step C) has a temperature in the range from 90 to below 150° C., preferably in the range from 120 to below 150° C.

One advantage of the above-described aspect of the present invention is that on account of the two above-described aspects of the present invention, it is preferable in accordance with the invention when the temperature of the rubber mixture can additionally be controlled twin-screw extruder and/or in the further kneading unit by means of cooling elements incorporated in the extruder barrel.

Preference is given to a process as described above or as described above as preferred, wherein the resulting proportion of comminuted vulcanized rubber particles in step B) that passes through a 44 mesh sieve in a sieving test according to Japanese industrial standard JIS P-8207 is at least 50% by weight of the resulting total mass of comminuted rubber particles in step B), preferably at least 80% by weight of the resulting total mass of comminuted rubber particles in step B).

One advantage of the above-described aspect of the present invention is that such vulcanized rubber particles can be devulcanized particularly rapidly and/or give rise to particularly free-flowing devulcanized mixtures.

Preference is given to a process as described above or as described above as preferred, wherein the rubber mixture cooled in step D) is mixed with further rubber mixture constituents to give an unvulcanized fresh rubber mixture, wherein the further rubber mixture constituents are selected from the group consisting of natural and/or synthetic rubber, butadiene rubber, styrene-butadiene rubber, fillers, plasticizers, ageing stabilizers and vulcanizing agents.

Preference is given to a process as described above or as described above as preferred, wherein the average particle diameter of the resulting rubber particles in step B) is in the range from 0.01 mm to 50 mm, preferably in the range from 0.1 mm to 20 mm.

One advantage of the above-described aspect of the present invention is that such vulcanized rubber particles can be devulcanized particularly rapidly and/or give rise to particularly free-flowing devulcanized mixtures.

Preference is given to a process as described above or as described above as preferred, wherein the rubber mixture produced or provided in step A) consists of natural rubber, butadiene rubber and/or SBR rubber, where there is preferably 50 phr to 100 phr of a natural rubber in the rubber mixture produced or provided in step A).

One advantage of the above-described aspect of the present invention is that, in particular, rubber mixtures having a high proportion of natural rubber should be obtained in order that a smaller amount of natural renewable resources has to be used, without excessively high temperatures and pressures shortening the polymer chains of the natural rubber.

Preference is given to a process as described above or as described above as preferred, wherein the rubber mixture produced or provided in step A) comprises a filler, preferably carbon black, wherein the filler is preferably present in an amount of 10 to 150 phr, more preferably in an amount of 70 to 150 phr.

One advantage of the above-described aspect of the present invention is that, in particular, rubber mixtures having a high proportion of natural rubber should be recovered, in order that, in particular, a lower level of fossil resources, i.e. carbon black, has to be used.

A particularly high degree of preference is given to a process as described above, comprising the following steps:
A) providing or producing a vulcanized rubber mixture,
B) comminuting the vulcanized rubber mixture to a granular material composed of vulcanized rubber particles, where the vulcanized rubber particles have a maximum particle diameter of 10 mm,
C) extruding the vulcanized rubber particles produced in step B) in a corotating twin-screw extruder at a shear rate in the range from 10 to 80 s$^{-1}$, where the temperature of the vulcanized rubber particles during extrusion is less than 200° C., to give a devulcanized rubber mixture having a temperature above 100° C.,
D) cooling the devulcanized rubber mixture in a further kneading unit, so as to give a devulcanized rubber mixture having a temperature in the range from 50° C. to 100° C.,
wherein
the further kneading unit in step D) comprises a single-screw extruder and a gear pump,
during the extruding in step C), a specific energy input of 0.1 to 2.5 kWh/kg per screw is introduced into the vulcanized rubber particles, based on the total mass of the vulcanized rubber particles extruded in step C),
the devulcanized rubber mixture, after the cooling in the further kneading unit in step D), in a step E), is pushed through a filter unit comprising a sieve and/or a perforated plate, wherein the devulcanized rubber mixture, on account of the pushing through the filter unit, is heated to a temperature of 100° C. to 150° C.,
the twin-screw extruder in step C) has a length of less than 60 D.
during the extruding in step C), the means of controlling the temperature of the extruded rubber particles has a specific heat transfer coefficient to EN ISO 6946 in the range from 100 to 5000 W/(m$^2$*K) and/or a specific heat capacity in the range from 3 to 5 kJ/(kg·K),
during the extruding in step C), the screw speed of the screws of the twin-screw extruder is mainly within the range from 100 to 300 revolutions per minute,
during the extruding in step C), the means of controlling the temperature of the extruded rubber particles does not react chemically with the rubber particles within the temperature range between 10° C. and 200° C., the temperature of the vulcanized rubber particles during the extruding in step C) is in the range from 110 to 150° C., the resulting proportion of comminuted rubber particles in step B) that passes through a 44 mesh sieve in a sieving test according to Japanese industrial standard JIS P-8207 is at least 80% by weight of the resulting total mass of comminuted rubber particles in step B), the rubber mixture produced or provided in step A) consists of natural rubber, butadiene rubber and/or SBR rubber, where there is 50 phr to 100 phr of a natural rubber in the rubber mixture produced or provided in step A), and the rubber mixture produced or provided in step A) comprises a carbon black, where the carbon black is present in an amount of 50 to 150 phr.

The above-described advantageous aspects of a process of the invention for devulcanizing a vulcanized rubber mixture are also applicable to all aspects of an apparatus described hereinafter, and the advantageous aspects of apparatuses of the invention that are discussed hereinafter are also applicable to all aspects of a process of the invention for devulcanizing a vulcanized rubber mixture.

The invention also relates to an apparatus for performing a process any of the preceding claims, comprising a twin-screw extruder, preferably having a length of less than 60 D, a further kneading unit, preferably comprising a single-screw extruder and/or a gear pump, a filter unit comprising a sieve and/or a perforated plate, and optionally a particle comminution unit for comminuting a vulcanized rubber mixture to a granular material composed of vulcanized rubber particles having a maximum particle diameter of 100 mm and/or having an average particle diameter in the range from 0.1 mm to 20 mm.

An above-described particle comminution unit is, for example, the "bomatic B1000S" and "bomatic B1000DD" products from "Bomatik" or the "ZHS 1700 single-shaft shredder" product from Amis.

The above-described advantageous aspects of an apparatus of the invention for performing a method and of a process of the invention for devulcanizing a vulcanized rubber mixture are also applicable to all aspects of uses described hereinafter, and the advantageous aspects of inventive uses that are discussed hereinafter are correspondingly applicable to all aspects of an apparatus of the invention for performing a process as described above or as described above as preferred and of a process of the invention for devulcanizing a vulcanized rubber mixture.

The invention also relates to a use of an apparatus as described above or as described above as preferred for devulcanizing a vulcanized rubber mixture.

The invention also relates to use of a devulcanized rubber mixture as described above or as described as preferred or as described above as particularly preferred for production of an industrial rubber article, preferably a vehicle tire.

The invention also relates to use of a rubber mixture devulcanized by means of the apparatus of the invention as described above or as described above as preferred for production of an industrial rubber article, preferably a vehicle tire.

DESCRIPTION OF FIGURES

The Figures Show:

FIG. 1 shows a schematic diagram of an inventive apparatus 1 in a first embodiment comprising a hopper 10 for feeding vulcanized rubber particles 2 having a maximum particle diameter of 100 mm and having an average particle diameter in the range from 0.1 mm to 20 mm into a twin-screw extruder 3, a twin-screw extruder 3 having a length of less than 60 D, a further kneading unit 4 comprising a single-screw extruder 5 and a gear pump 6, and finally a filter unit 7 comprising a sieve and/or a perforated plate.

Figure 1:
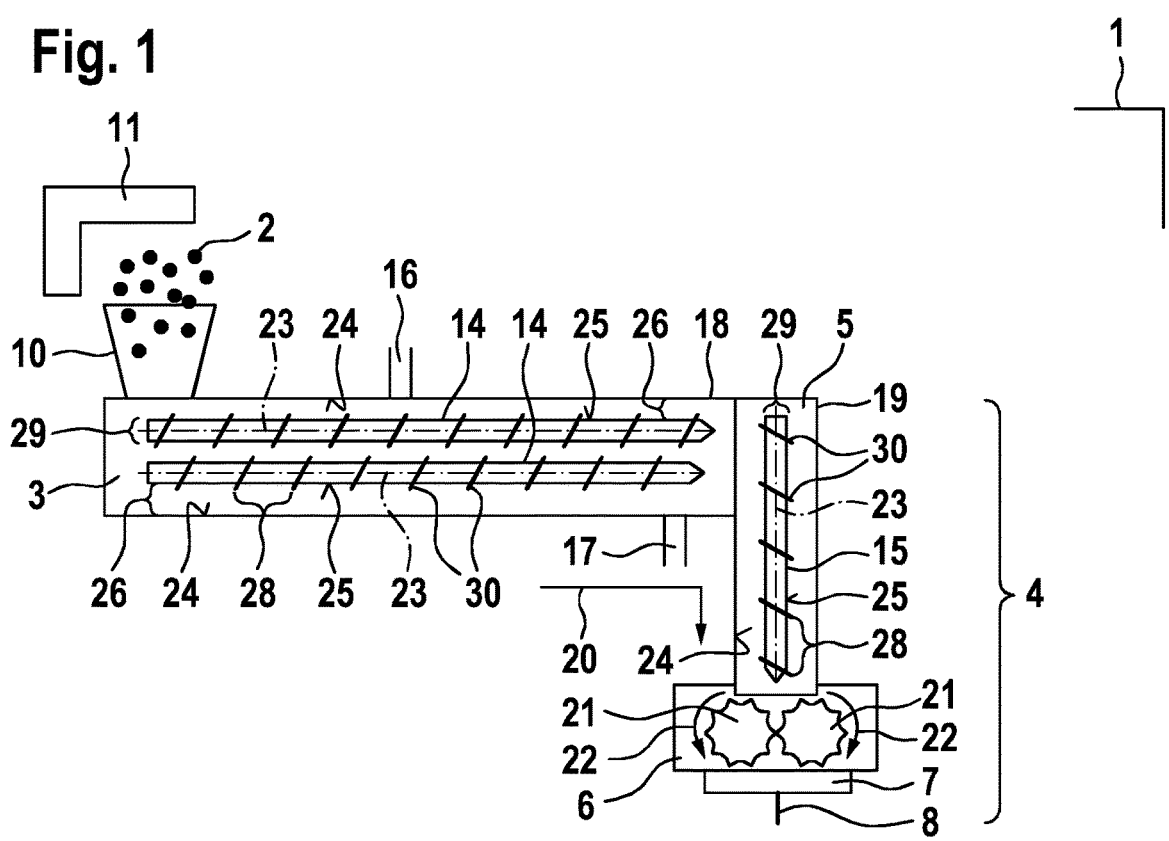
FIG. 1: A schematic cross section through an apparatus of the invention comprising a twin-screw extruder, a single-screw extruder and a gear pump, and a strainer with a sieve and a perforated plate, wherein the rubber mixture is transferred from the twin-screw extruder without a nozzle and without a further hopper directly into the single-screw extruder.

Also shown in FIG. 1 is the particle comminution unit 11 for comminuting a vulcanized rubber mixture to a granular material composed of vulcanized rubber particles 2 having a maximum particle diameter of 100 mm and having an average particle diameter in the range from 0.1 mm to 20 mm, in order then to feed these via the hopper 10 into the twin-screw extruder 3.

The twin-screw extruder 3 has a barrel 18 with an inner surface 24, two screws 14 each having a screw rotation axis 23, and a supply and removal unit 16, 17. The screws 14 of the twin-screw extruder 3 here comprise a screw core 29 having an outer surface 25 and multiple screw segments 28 with screw flights 30. Additionally shown is the distance 26 that constitutes the parameter h in formula 1.

The single-screw extruder 5 has a barrel 19 with an inner surface 24 and one screw 15 each having a screw rotation axis 23, and a. The screw 14 of the single-screw extruder 3 here comprises a screw core 29 having an outer surface 25 and multiple screw segments 28 with screw flights 30.

The gear pump 6 has two gears that rotate in direction 22, and in FIG. 1 follows after the single-screw extruder 5. Finally, the devulcanized rubber mixture 8 is pushed by the gear pump 6 through the filter unit 7.

Figure 2:
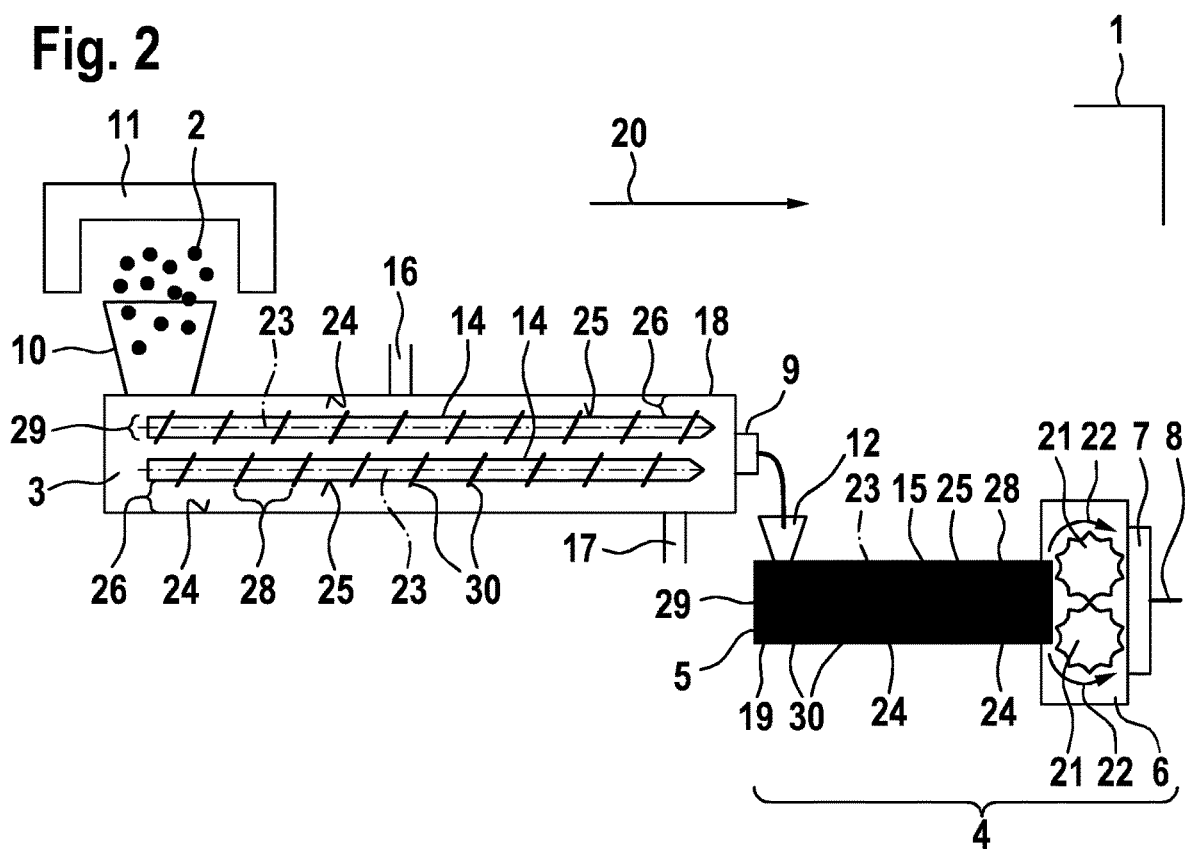
FIG. 2: A schematic cross section through an apparatus of the invention comprising a twin-screw extruder, a single-screw extruder and a gear pump, and a strainer with a sieve and a perforated plate, wherein the rubber mixture is transferred from the twin-screw extruder with a nozzle and via a further hopper into the single-screw extruder.
Figure 3:
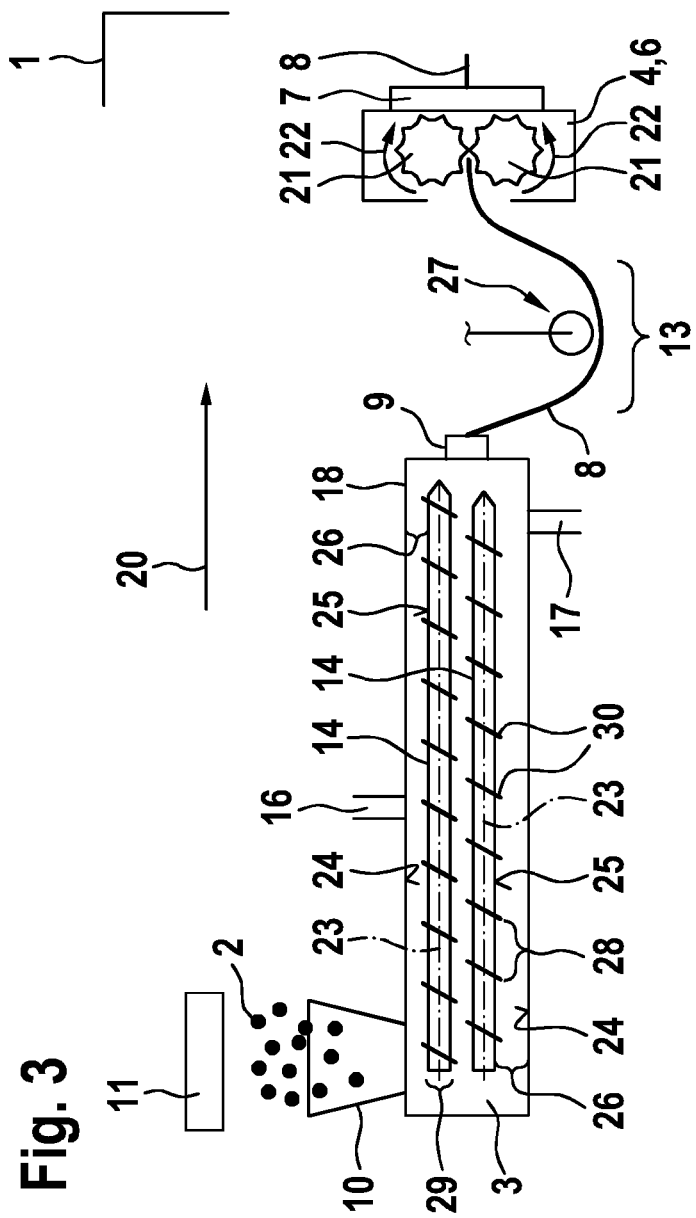
FIG. 3: A schematic cross section through an apparatus of the invention comprising a twin-screw extruder, a gear pump and a strainer with a sieve and a perforated plate, wherein the rubber mixture is transferred from the twin-screw extruder with a nozzle via a material loop into the gear pump.

The construction shown in FIG. 1, compared to the construction indicated in FIGS. 2 and 3, has greater temperature control and more automatable production. The latter is advantageous for continuous processes in particular.

FIG. 2 shows a schematic diagram of an inventive apparatus 1 in a further embodiment, wherein, by contrast with FIG. 1, the devulcanized rubber mixture 8 is pushed through a nozzle 9 at the end of the twin-screw extruder 3 and then supplied to the single-screw extruder 5 via a further hopper 12. One advantage of this construction is that further rubber mixture constituents, for example plasticizers or fillers, can be added in order to reduce or increase the shear forces in the single-screw extruder and hence to achieve an optimal temperature profile along the screw of the single-screw extruder for preservation of the rubber polymer chains.

The twin-screw extruder 3 has a final nozzle 9, a barrel 18 with an inner surface 24, two screws 14 each having a screw rotation axis 23, and a supply and removal unit 16, 17. The screws 14 of the twin-screw extruder 3 here comprise a screw core 29 having an outer surface 25 and multiple screw segments 28 with screw flights 30. Additionally shown is the distance 26 that constitutes the parameter h in formula 1.

The single-screw extruder 5 has a further hopper 12, a barrel 19 with an inner surface 24 and one screw 15 each having a screw rotation axis 23, and a. The screw 14 of the single-screw extruder 3 here comprises a screw core 29 having an outer surface 25 and multiple screw segments 28 with screw flights 30.

The gear pump 6 has two gears that rotate in direction 22, and in FIG. 2 follows after the single-screw extruder 5. Finally, the devulcanized rubber mixture 8 is pushed by the gear pump 6 through the filter unit 7.

FIG. 3 shows a schematic diagram of an inventive apparatus 1 in a further embodiment, wherein, by contrast with FIG. 1, the devulcanized rubber mixture 8 does not pass through a single-screw extruder, but is transferred directly from the twin-screw extruder 3 via what is called a material loop 13 into the gear pump 6. The adjustment of the material loop 13 is achieved with a known loop unit 27 for forming a material loop 13 and for adjusting the length of the material loop 13, including intermediate storage means for a rubber mixture belt.

The advantage of the material loop 13 is that, according to the length of the material loop 13, the temperature on entry into the gear pump 6 can be determined accurately, and hence better temperature control and especially compliance of the temperatures within the range from 50° C. to 100° C. in step D) of the process of the invention can be guaranteed.

One advantage of this construction without a single-screw extruder is that it is possible via the choice of loop length to adjust the exact temperature of the rubber mixture coming from the twin-screw extruder rapidly to the respective process or the respective rubber mixture to be devulcanized, hence leading to short lifetimes in a continuous process in an apparatus of the invention.

The twin-screw extruder 3 has a barrel 18 with an inner surface 24, two screws 14 each having a screw rotation axis 23, and a supply and removal unit 16, 17. The screws 14 of the twin-screw extruder 3 here comprise a screw core 29 having an outer surface 25 and multiple screw segments 28 with screw flights 30. Additionally shown is the distance 26 that constitutes the parameter h in formula 1.

The gear pump 6 has two gears that rotate in direction 22, and in FIG. 3 follows after the loop unit 27. Finally, the devulcanized rubber mixture 8 is pushed by the gear pump 6 through the filter unit 7.

EXPERIMENTAL EXAMPLES

Test Methods
1. Mooney Viscosity
   The results were ascertained in accordance with the DIN 53523 (ML1+3) method at 100° C. (Mooney units M. U.).
2. Shore A Hardness
   The results were ascertained in accordance with the DIN method at room temperature by means of a durometer to DIN ISO 7619-1.
3. Resilience
   The results were ascertained in accordance with the DIN 53 512 method at room temperature.
4. 300 Modulus
   The stress value results were ascertained in accordance with DIN 53 504 method at 300% static strain at room temperature.
5. Maximum (Max) Loss Factor Tan 5 (Tangent Delta)
   The results were ascertained in accordance with the DIN 53 513 method from dynamic-mechanical measurement, strain sweep at 55° C.

Production:
Production of a rubber mixture devulcanized in accordance with the invention and not in accordance with the invention:
   The devulcanized rubber mixture was produced in steps B), C) and D). In the first process step B), rubber from used car tire treads was comminuted by means of a particle comminution unit to vulcanized rubber particles having a maximum particle diameter and having an average particle diameter as shown in table A. Subsequently, the rubber particles thus comminuted were processed with the aid of an apparatus of the invention as shown in FIG. 1 to give a devulcanized rubber mixture. The parameters established here in the single-screw and twin-screw extruder are those shown in tab. A. The procedure here was such that the rubber mixture extruded in the twin-screw extruder did not experience any higher shear forces in the single-screw extruder and in the gear pump than in the twin-screw extruder.

TABLE A

Experimental data of the devulcanizates VD1, ED1 and ED2 produced in accordance with the invention and not in accordance with the invention in an apparatus of the invention

| Designation Property | | VD1 Non-inv. | ED1 Inv. | ED2 Inv. |
| --- | --- | --- | --- | --- |
| | Unit | | | |
| | Parameter | | | |
| Twin-screw extruder | | | | |
| Temperature in the barrel | ° C. | 250 | 170 | 130 |
| Shear forces | 1/s | 80 | 80 | 80 |
| Single-screw extruder | | | | |
| Temperature on exit | ° C. | 150 | 94 | 86 |
| | Properties | | | |
| Rubber particles | | | | |
| Average particle size | mm | 2 | 2 | 2 |
| Maximum particle size | mm | 5 | 5 | 5 |

Production of the Specimens:
   The devulcanized rubber mixture VD1, ED1 and ED2 was produced by the above-described process of the invention. The finished mixture is produced by addition of NR, BR, SBR, the respective devulcanized rubber mixture and further additives as specified in table 1 to a mixer in a first mixing stage and by subsequent addition of the vulcanization system in a second mixing stage.
   This is followed by further processing by vulcanization of the finished mixture, wherein sulfur crosslinking takes place due to the vulcanization system added in the context of the present invention. The finished mixture was vulcanized at 160° C. for 12 min.

Results:

TABLE 1

Experimental data of the rubber composition for inventive experiments E2 and E3 and the noninventive comparative experiment V1

| Constituent | Unit | Mixing stage | Comp. exp. V1 Non-inv. | Exp. E2 Inv. | Exp. E3 Inv. |
|---|---|---|---|---|---|
| NR | phr | 1 | 50 | 50 | 50 |
| BR | phr | 1 | 20 | 20 | 20 |
| SBR | phr | 1 | 30 | 30 | 30 |
| Devulcanizate VD 1 | phr | 1 | 40 | | |
| Devulcanizate ED 1 | phr | 1 | | 40 | |
| Devulcanizate ED 2 | phr | 1 | | | 40 |
| Carbon black | phr | 1 | 30 | 30 | 30 |
| Plasticizer | phr | 1 | 15 | 15 | 15 |
| Aging inhibitor | phr | 1 | 4.5 | 4.5 | 4.5 |
| Stearic acid | phr | 1 | 2 | 2 | 2 |
| ZnO | phr | 1 | 2.5 | 2.5 | 2.5 |
| Sulfur | phr | 2 | 2.5 | 2.5 | 2.5 |
| Vulcanizing agent | phr | 2 | 1.4 | 1.4 | 1.4 |

TABLE 2

Experimental data of the finished rubber mixture comprising the devulcanizates produced in accordance with the invention and not in accordance with the invention, and of the specimens that result therefrom after vulcanization

| Property | Unit | Comp. exp. V1 Non-inv. V1 | Exp. E1 Inv. E1 | Exp. E2 Inv. E2 |
|---|---|---|---|---|
| Finished rubber mixture | | | | |
| Mooney (ML1 + 3) | MU | 32 | 34 | 36 |
| Specimens of the vulcanized finished mixture | | | | |
| Shore A hardness @ RT | ShA | 48.8 | 49.1 | 49.5 |
| Resilience @RT | % | 45.8 | 47.4 | 48.3 |
| 300 modulus @RT | MPa | 4.8 | 5.3 | 5.4 |
| tan d (max) | — | 0.123 | 0.113 | 0.111 |

The experimental data from tab. 2 show that the control of temperature and the compliance of the parameter of the vulcanized rubber particles used and of the low shear rates play an important role in order to shorten the polymer chains of the rubber molecules to a minimum degree in the course of devulcanization. The finished rubber mixture containing the devulcanizate ED1 has higher Mooney viscosity and, after vulcanization, has higher resilience, a higher 300 modulus and a low loss factor tan d(max) with virtually the same Shore A hardness. The differences were additionally increased when, in the twin-screw extruder in the experimental setup, not only a temperature of 170° but a maximum temperature of 130° C. was observed (cf. Exp. 2 with Exp. 3). This shows that the chain length of the devulcanized rubber mixture that was obtained in inventive experiment Exp. 3 were even longer than those of the devulcanized rubber mixture according to inventive experiment Exp. 2.

LIST OF REFERENCE NUMERALS 1 inventive apparatus
2 vulcanized rubber particles; vulcanized rubber particles having a maximum diameter of 100 mm and having an average particle diameter of 0.1 mm to 20 mm
3 twin-screw extruder
4 further kneading unit
5 single-screw extruder
6 gear pump
7 filter unit comprising a sieve and a perforated plate; strainer
8 devulcanized rubber mixture
9 nozzle at the end of the twin-screw extruder
10 hopper for supply of vulcanized rubber particles to a twin-screw extruder
11 particle comminution unit for comminuting a vulcanized rubber mixture to a granular material composed of vulcanized rubber particles having a maximum particle diameter of 100 mm and having an average particle diameter in the range from 0.1 mm to 20 mm
12 further hopper for supply of vulcanized rubber particles to a single-screw extruder
13 material loop of devulcanized rubber mixture
14 screw of a twin-screw extruder
15 screw of a single-screw extruder
16 feed unit for feeding of a means of controlling the temperature of the extruded rubber particles into the twin-screw extruder
17 removal unit for removal of an added means of controlling the temperature of the extruded rubber particles from the twin-screw extruder
18 barrel of a twin-screw extruder
19 barrel of a single-screw extruder
20 extrusion direction; production direction
21 gears of the gear pump
22 rotation direction of the gears of the gear pump
23 axis of screw rotation
24 inner surface of the extrusion barrel
25 outer surface of the screw core
26 distance in a cross section at right angles to the axis of rotation of the screw between the inner face of the extrusion barrel and the outer surface of the screw core
27 loop unit for forming a material loop and for adjusting the length of the material loop; intermediate storage means for a rubber mixture belt
28 screw segment in the extruder
29 screw core
30 screw flight; screw land

The invention claimed is:
1. A process for devulcanizing a vulcanized rubber mixture, the process comprising:
A) providing a vulcanized rubber mixture,
B) comminuting the vulcanized rubber mixture to a granular material composed of vulcanized rubber particles (2), wherein the vulcanized rubber particles (2) have a maximum particle diameter of 100 mm,
C) extruding the vulcanized rubber particles (2) produced in step B) in a twin-screw extruder (3) at a shear rate of less than 100 $s^{-1}$, wherein the temperature of the vulcanized rubber particles (2) during extrusion is less than 200° C., to give a devulcanized rubber mixture (8) having a temperature above 100° C.,
D) cooling the devulcanized rubber mixture (8) in a further kneading unit (4), so as to give a devulcanized rubber mixture (8) having a temperature in the range of from 50° C. to 100° C.,

E) wherein after step D), the devulcanized rubber mixture (8) is heated to a temperature of 100° C. to 150° C. and is then mixed with another rubber mixture.

2. The process as claimed in claim 1, wherein, during the extruding in step C), a specific energy input of from 0.01 to 5 kWh/kg per screw (14) is introduced into the vulcanized rubber particles (2), based on the total mass of the vulcanized rubber particles (2) extruded in step C).

3. The process as claimed in claim 1, wherein, during the extruding in step C), a specific energy input of from 0.01 to 2.5 kWh/kg per screw (14) is introduced into the vulcanized rubber particles (2), based on the total mass of the vulcanized rubber particles (2) extruded in step C).

4. The process as claimed in claim 1, wherein the further kneading unit (4) in step D) comprises a single-screw extruder (5).

5. The process as claimed in claim 1, wherein the further kneading unit (4) in step D) comprises a gear pump (6).

6. The process as claimed in claim 1, wherein in step E), the devulcanized rubber mixture is pushed through a filter unit (7) comprising a sieve and/or a perforated plate, wherein the devulcanized rubber mixture (8), on account of the pushing through the filter unit (7), is heated to the temperature of from 50100° C. to 150° C.

7. The process as claimed in claim 1, wherein, during the extruding in step C), a means of controlling the temperature of the extruded rubber particles (2) is added to the twin-screw extruder (3), wherein the means of controlling the temperature of the extruded rubber particles (2) does not react chemically with the rubber particles (2) within the temperature range of from 10° C. and 200° C.

8. The process as claimed in claim 7, wherein, during the extruding in step C), the means of controlling the temperature of the extruded rubber particles (2) has a specific heat transfer coefficient to EN ISO 6946 in the range of from 100 to 5000 W/(m$^2$*K) and a specific heat capacity in the range of from 3 to 5 kJ/(kg·K).

9. The process as claimed in claim 8, wherein the means of controlling the temperature of the extruded rubber particles is a process oil.

10. The process as claimed in claim 1, wherein, during the extruding in step C), the screw speed of the screws (14) of the twin-screw extruder (3) is within the range of from 10 to 500 revolutions per minute.

11. The process as claimed in claim 1, wherein the vulcanized rubber particles (2) produced in step B) are extruded in step C) in the twin-screw extruder (3) at a shear rate in the range of from 10 to 80 s$^{-1}$.

12. The process as claimed in claim 1, wherein the twin-screw extruder (3) in step C) has a length of less than 60D.

13. The process as claimed in claim 1, wherein the temperature of the vulcanized rubber particles (2) during the extruding in step C) is in the range of from 105 to 180° C.

14. The process as claimed in claim 1, wherein the temperature of the vulcanized rubber particles (2) during the extruding in step C) is in the range of from 110 to 150° C.

15. The process as claimed in claim 1, wherein the resulting proportion of comminuted rubber particles (2) in step B) that passes through a 44 mesh sieve in a sieving test according to Japanese industrial standard JIS P-8207 is at least 80% by weight of the resulting total mass of comminuted rubber particles (2) in step B).

16. The process as claimed in claim 1, wherein the average particle diameter of the resulting rubber particles (2) in step B) is in the range of from 0.1 mm to 20 mm.

17. The process as claimed in claim 1, wherein the rubber mixture provided in step A) comprises from 50 to 100 phr of a natural rubber, 10 to 150 phr of carbon black, and optionally butadiene rubber and/or SBR rubber.

18. The process as claimed in claim 1,
wherein the shear rate of less than 100 s-1 is performed over all screw segments, and
wherein the temperature of the vulcanized rubber particles (2) during extrusion is less than 170° C.

19. The process as claimed in claim 18,
wherein, during the extruding in step C), a means of controlling the temperature of the extruded rubber particles (2) is added to the twin-screw extruder (3), wherein the means of controlling the temperature of the extruded rubber particles (2) does not react chemically with the rubber particles (2) within the temperature range of from 10° C. and 200° C., and
wherein, during the extruding in step C), the means of controlling the temperature of the extruded rubber particles (2) has a specific heat transfer coefficient to EN ISO 6946 in the range of from 100 to 5000 W/(m$^2$*K) and a specific heat capacity in the range of from 3 to 5 kJ/(kg·K).

* * * * *